United States Patent [19]
Hall

[11] Patent Number: 5,758,029
[45] Date of Patent: May 26, 1998

[54] FORMAL TRUST BUILDING IN THE EXECUTION OF PARTIALLY TRUSTED BEHAVIORS

[75] Inventor: Robert J. Hall, Berkeley Heights, N.J.

[73] Assignee: Lucent Technologies Inc., Murray Hill, N.J.

[21] Appl. No.: 608,228

[22] Filed: Feb. 28, 1996

[51] Int. Cl.$^6$ .................................................. G06F 15/18
[52] U.S. Cl. ............................................... 395/51; 395/77
[58] Field of Search ................................... 395/76, 77, 51

[56] References Cited

U.S. PATENT DOCUMENTS

| | | | |
|---|---|---|---|
| 5,170,464 | 12/1992 | Hayes et al. | 395/76 |
| 5,283,856 | 2/1994 | Gross et al. | 395/51 |
| 5,363,473 | 11/1994 | Stolfo et al. | 395/76 |

OTHER PUBLICATIONS

P. Langley, "Exploring the space of cognitive architectures," Behavior Research Methods & Instrumentation, vol. 15(2), pp. 289–299, Dec. 1983.

T. Yamaguchi and Y. Tachibana, "A Technical Analysis Expert System with Knowledge Refinement Mechanism," Proc. First Int'l. Conf. on Artificial Intelligence on Wall Street, pp. 86–91, Oct. 1991.

C. Mao and J. Hong, "Refinement of the Structure of Knowledge Base by Learning," Proc. 1991 IEEE Int'l. Conf. on Tools for Artificial Intelligence, pp. 264–271, Nov. 1991.

G.D. Tecuci, "Automating Knowledge Acquisition as Extending, Updating, and Improving a Knowledge Base," IEEE Trans. on Systems, Man, and Cybernetics, vol. 22(6), pp. 1444–1460, Nov. 1992.

R. Hall, "Validation of Rule-based Reactive Systems by Sound Scenario Generalization," Proc. Eighth Knowledge-Based Software Engineering Conf., pp. 30–39, Sep. 1993.

R.J. Hall, "Systematic Incremental Validation of Rule-based Reactive Systems," Proc. Ninth Knowledge-Based Software Engineering Conf., pp. 69–78, Sep. 1994.

R.J. Hall, "Systematic Incremental Validation of Reactive Systems via Sound Scenario Generalization," Automated Software Engineering, 2, 131–166 (1995).

T. Mitchell et al., "Experience with a Learning Personal Assistant," Communications of the ACM, vol. 37, No. 7, 81–91 (Jul. 1994).

M. Eisenberg et al., "Programmable Design Environments: Integrating End–User Programming with Domain–Oriented Assistance," Human Factors in Computing Systems, CHI '94 Celebrating Interdependence, 431–437 (Apr. 24–28, 1994).

D. C. Smith et al., "KIDSIM: Programming Agents Without a Programming Language," Communications of the ACM, vol. 37, No. 7, 55–67 (Jul. 1994).

R. J. Hall, "Agents Helping Agents: Issues in Sharing How–to–Knowledge (Abstract of a Research Proposal)," Proc. AAAI–95 Spring Symposium on Info. Gathering from Heterogeneous Distributed Environments, 4 pages (1995).

O. Etzioni et al., "The First Law of Robotics (a call to arms)," Proceedings of the 12th National Conference on AI, 17–23 (1994–AAAI Press.

(List continued on next page.)

Primary Examiner—Robert W. Downs
Attorney, Agent, or Firm—Donald P. Dinella

[57] ABSTRACT

A method for executing partially trusted behaviors using an automated assistant. The method employs a guarded execution mode which provides for the safe execution of partially trusted behaviors. Further, incremental trust growth is provided for allowing more behaviors to be executed autonomously by the automated assistant. Trust growth is accomplished through the use of a trust library. The method also employs trust reuse which provides for the reuse of individual trust library entries across behaviors which are proven to be erroneous by the automated assistant.

26 Claims, 3 Drawing Sheets

OTHER PUBLICATIONS

A. Cypher, "Eager: Programming Repetitive Tasks by Example," *1991 ACM Conference Proceedings Conference on Human Factors in Computing Systems*, 33–39 (1991).

P. R. Cohen et al., "An Open Agent Architecture," *AAAI Spring Symposium on Software Agents*, 1–8 (1994).

P. Maes, "Agents that Reduce Work and Information Overload," *Communications of the ACM*, vol. 37, No. 7, 31–40 (Jul. 1994).

O. Etzioni et al., "A Softbot–Based Interface to the Internet," *Communications of the ACM*, vol. 37, No. 7 (Jul. 1994).

FORMAL TRUST BUILDING IN THE EXECUTION OF PARTIALLY TRUSTED BEHAVIORS

FIELD OF THE INVENTION

The present invention relates to automated assistants and, more particularly, to the validation of the trustworthiness of such assistants in performing in conformance with the goals and priorities defined by users of such assistants.

BACKGROUND OF THE INVENTION

Technological advances have fostered the development of software tools to perform tasks previously performed only by humans. The purpose of these tools is to provide efficient execution of tasks by shielding humans from low-level execution details. Increasingly, an individual's business and/or personal activities are being performed in computer networked information environments. These environments provide an opportunity to delegate even more tasks to computers instead of humans. Typically, most commercial software tools, while providing new capabilities, do not shield their users from detailed activities. On the contrary, users often need to deal with numerous software packages, each of which may have hundreds of functional features. Furthermore, users need to integrate the features of these software packages manually to perform a desired task, such as saving files, cutting and pasting, transferring files among machines, etc. This operational complexity and need for manual intervention threaten to negate some of the efficiency gains sought from increased computerization.

To alleviate human intervention, computational environments have been designed with special interfaces to shield the user from low-level complexity while providing for the automation of mundane, idiosyncratic tasks. Such interfaces are known as "automated assistants". To be an acceptable replacement for a human assistant, an automated assistant should possess, at a minimum, the following properties: (1) automation—the ability to perform user tasks with little or no intervention; (2) trustworthiness or validation—the ability to perform the tasks in a manner that is consistent with the user's goals and priorities; and (3) extensibility—the ability to delegate new, idiosyncratic tasks, with the assistant assuming some of the burden in finding out how to perform them.

The knowledge or program code enabling an automated assistant to execute a given task is known as a "behavior". Heretofore, much work has been devoted to improving the task automation and extensibility properties of automated assistants. Relatively little attention has been directed to developing techniques for increasing the trustworthiness of an assistant, and in particular, the validity of assistant behavior for a given task. This is because automated assistant behaviors, unlike commercial software packages which have a published specification and large pool of users who report problems, are typically idiosyncratic and unsupported.

One conventional technique used in end-user programming environments addresses the extensibility of an automated assistant. In accordance with this technique, a task domain is formalized so that the desired programs can be expressed as simple combinations of domain-relevant building blocks. Such end-user programming environments are described in Eisenberg et al., *Programmable Design Environments: Integrating End-User Programming With Domain-Oriented Assistance*, in Proc. 1994 ACM Conf. on Human Factors in Computing Systems (1994); and Smith et al., KIDSIM: Programming Agents Without A Programming Language, Comm. ACM, 37(7), (1994), which are herein incorporated by reference for all purposes. In this "task formalization" approach, the environment builder formalizes a task domain which leads to clear programs that are relatively easy to validate and, hence, trust. However, the success of this approach requires completeness, correctness, and composability of the building blocks. Further, such an environment requires a significant development effort and must focus on a narrow domain. Thus, the formalization of a task domain, although providing trustworthiness, limits the extensibility of general assistant-like interfaces and requires a significant development effort.

Another technique directed at the extensibility of automated assistants is known as "programming by demonstration." Such a technique is described in A. Cypher, *EAGER: Programming Repetitive Tasks By Example*, in Proc. 1991 ACM Conf. on Human Factors in Computing Systems, (1991), which is herein incorporated by reference for all purposes. In programming by demonstration, a program for a task is constructed by the assistant through observing and generalizing directly from the user's actions in performing the task on particular example inputs. Thus, the user can trust the assistant to behave correctly when given the same (or substantially similar) set of inputs. However, any inputs falling outside this recognizable set thereby present potential sources for error.

A related approach to programming by demonstration is the "learning interface agents" technique which is described in Maes, *Agents That Reduce Work and Information Overload*, Comm. ACM, 37 (7) (1994) (hereinafter referred to as "Maes"); and Mitchell et al., *Experience With a Learning Personal Assistant*, Comm. ACM, 37(7), (1994), which are herein incorporated by reference for all purposes. According to the learning interface agents technique, the automated assistant generalizes task heuristics by watching the actions of a user. However, as with programming by demonstration, this technique also suffers from the potential problem of unvalidated generalization as discussed previously.

The aforementioned techniques deal in large extent with the manner in which an assistant obtains knowledge of how to carry out a task. However, the issue of trustworthiness and the ability of the assistant to use the obtained knowledge in accordance with user goals and priorities must also be addressed. One approach to the trust problem is to adopt an informal testing-based technique. Such a technique is described in *Maes* where it is assumed that the longer the user observes the workings of the automated assistant, either on actual tasks or in simulation (see Cohen et al., *An open agent architecture*, AAAI Spring Symposium on Software Agents, p. 1-8, 1994), the better the user is able to predict the assistant's behavior. However, the user has no rigorous basis for predicting the assistant's behavior on unseen cases. The trust "growth" of this technique is based on the human user making generalizations from specific instances of the assistant's behavior. One drawback of this approach is that as knowledge is added to the assistant, either through acquiring new capabilities (e.g., Maes's memory-based architecture) or through fixing errors in existing behaviors/ knowledge, its behavior can change. The behavior changes thereby call into question any trust based on informal past experiences.

Another technique addressing the trust problem is the AI-planning approach developed by Weld & Etzioni (D. Weld & O. Etzioni, *The first law of Robotics*, In Proc. 12th Natl. Conf. on AI, 1994, AAAI Press). In the AI-planning approach, a task is specified declaratively (typically in first order logic) and a planner constructs a plan using axiomatized domain knowledge via automated reasoning. The use of such a planner guarantees the correctness of the plan implementation with respect to the stated task specification. However, a problem arises due to the difficulty in stating a complete and correct formal specification that includes sufficient detail to account for all the unexpected situations that may arise during execution. In addition, when using this approach, it is difficult to eliminate undesirable plans which correctly implement the defined task specification but violate some overriding (but unstated) user goal.

From the above discussion, it is apparent that an improved technique for increasing the trustworthiness of automated assistants which does not sacrifice extensibility or present potential errors by having unvalidated generalizations is desirable.

SUMMARY OF THE INVENTION

I have realized an incremental validation technique for increasing the trustworthiness of an automated assistant and providing for the autonomous execution of untrusted or partially trusted behaviors.

In accordance with an aspect of the invention, an untrusted or partially trusted behavior is executed by the automated assistant in a guarded execution mode. The execution of the behavior is carried out autonomously in accordance with a known set of general trusted situation/action pairs. The known set of trusted situation/action pairs is stored in a trust library for access by the assistant. Upon encountering an untrusted situation, a predetermined contingency behavior or a predetermined response may be executed which will, for example, either (a) safely abort the behavior or (b) explicitly query the user as to whether the next action to be taken by the behavior is acceptable. In addition, when an untrusted situation is encountered a record is made of the situation and, in accordance with an embodiment of the invention, a sound scenario generalization is computed defining a general situation/action pair for the situation on (i.e., situation/computed-action pair). The situation/computed-action pair is stored and a determination is made as to whether the pair defines a response which may be taken by the assistant (i.e., the generalization is in conformance with the user's goals and priorities). If acceptable to the user, the computed generalization is added to the trust library as a formal generalization thereby increasing the trustworthiness of the assistant by broadening the set of trusted situation/action pairs. Advantageously, as the number of trust library entries increases more situations encountered by the assistant are likely to be trusted allowing for the autonomous execution thereof.

In accordance with another aspect of the invention, the knowledge contained within the trust library is employed as the basis for constructing a new trust library for debugged behaviors which were previously identified as erroneous behaviors. In accordance with an embodiment of the present invention, when a behavior is identified as erroneous (i.e., not an accurate representation of user's goals and priorities) the behavior itself is debugged (i.e., corrected). However, this new behavior may not be compatible with the trust library of the prior behavior. Thus, in accordance with the invention, a technique is provided for using the prior trust library as the basis for the generation of new trust library for use in validating the corrected behavior. Advantageously, this eliminates the need to construct the new library entirely anew.

DETAILED DESCRIPTION

The invention is directed to a technique for use by an automated assistant for performing and increasing the trustworthiness of behaviors used to perform user tasks. Prior to discussing the detailed aspects of the present invention, a brief overview of certain aspects of the invention will be provided to lay the foundation for the more detailed description to follow.

Overview

Figure 1:
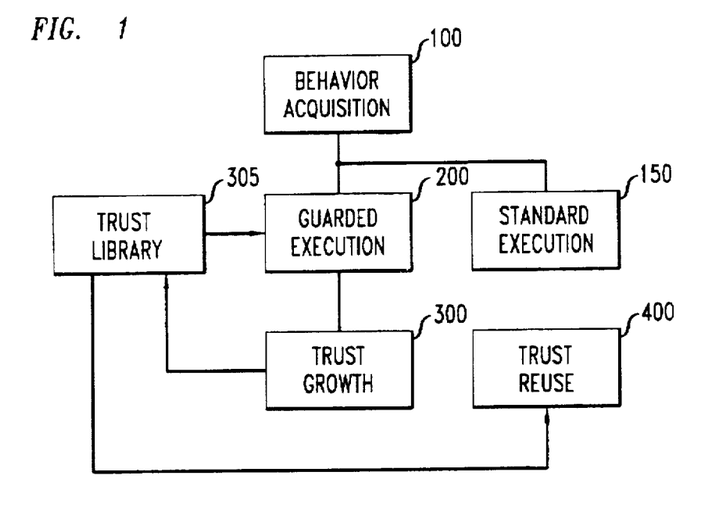
FIG. 1 is a functional block diagram of an illustrative embodiment of an automated assistant employing the incremental validation technique of the present invention.

FIG. 1 is a functional block diagram of an illustrative embodiment of an automated assistant employing the trust building technique of the present invention which will now be briefly described. As shown, the automated assistant comprises a behavior acquisition module 100, a guarded execution mode module 200, a trust library module 305, an incremental trust growth module 300, a standard execution mode module 150 and a trust reuse module 400. A more detailed description of each module will be presented in later sections of the specification. Although the various modules are described as discrete units, it is understood that the functions of these modules can be integrated as one or more functional units.

The behavior acquisition module 100 defines a behavior corresponding to a new task which is to be performed by the automated assistant. Various conventional techniques can be employed by the behavior acquisition module 100 to define or acquire behaviors. Such techniques, for example, include "AI-planning" and "programming by demonstration" as described previously. Alternatively, preexisting behaviors may be procured from other users or a central source (e.g., library). A "behavior", as used herein, represents the knowledge used by the automated assistant to execute a task in accordance with the user's goals, priorities and task parameters. The behavior takes into account the state variables of the assistant and the numerous events that the automated assistant may encounter while executing the behavior.

Each individual situation encountered by the automated assistant is referred to as a "concrete situation." For each situation, the behavior computes a potential action or actions to be taken by the assistant. The situation and associated action(s) jointly define a "situation/computed-action pair." Further, the computed-action for a given situation may be either trusted or untrusted. A trusted concrete situation action/pair is one that conforms with the user's goals, priorities and task parameters. Further, a trusted situation action/pair is a pair which has also been previously validated. An untrusted concrete situation/action pair represents a situation in which the assistant's action is not known to behave according to the user's goals and priorities. The behavior itself defines how the automated assistant behaves in response to these concrete situations (trusted or untrusted). Thus, each concrete situation is associated with one or more actions to be taken by the assistant to resolve the given situation. Of course, it will be apparent to those of ordinary skill in the art that the behavior may prescribe taking no action in some instances.

After acquisition of the behavior, the automated assistant must determine whether situation/action pairs arising during the execution of the behavior are trusted. In accordance with the present invention, an incremental validation approach is employed which entails the interaction of the guarded execution module 200, trust library module 305, trust growth module 300 and trust reuse module 400. To commence incremental validation, the automated assistant executes the behavior using the guarded execution module 200. Each time a concrete situation is encountered by the automated assistant, it checks to see if the computed action (i.e., response) is trusted by comparing it to a set of entries stored in the trust library 305. The entries in the library are formal representations of classes of trusted situation/action pairs. If the encountered situation/action pair is trusted, the automated assistant carries out the action(s) associated with the situation, as specified by the behavior. If, on the other hand, the situation lies outside the set of trusted situation/ action pairs (i.e. an untrusted concrete situation), the automated assistant, in accordance with an embodiment of the present invention, executes a predetermined contingency behavior.

The predetermined contingency behavior can be any behavior which is defined by the user prior to executing the behavior. For example, the contingency behavior may switch the automated assistant to operate in an interactive mode. This mode requires the user to explicitly confirm or deny the validity of the action to be performed by the behavior. If the action is valid, the situation/computed-action pair becomes trusted, i.e., in conformity with the user's task parameters. However, the user may not always be available to provide real-time input to the automated assistant. In such cases, the contingency behavior may be defined to abort the behavior in a predetermined manner.

When an untrusted concrete situation is encountered by the automated assistant, in addition to executing the contingency behavior, the incremental trust growth module 300 makes a record of the situation. At a later time, the untrusted concrete situation is then generalized by the incremental trust growth module 300. In accordance with the embodiment of the present invention, a generalization for the untrusted concrete situation/computed-action pair is derived using sound scenario generalization techniques as described in Hall, *Systematic Incremental Validation of Reactive Systems Via Sound Scenario Generalization*, J. Automated Software Engineering 2(2), p. 131–161, (1995) (hereinafter referred to as the "Hall" reference), which is hereby incorporated by reference for all purposes. Further, in accordance with the embodiment, the user sequences through the recorded untrusted concrete situations and reviews the computed generalizations made for each untrusted situation. If an individual computed generalization is acceptable to the user, the generalized situation/action pair is entered into the trust library. In addition, the untrusted concrete situation which led to the generalization computation is now also trustworthy and is also added to the trust library 300. As more untrusted situations are encountered, more generalized situation/action pairs after being confirmed by the user are added to the trust library 305. In this manner, the behavior is incrementally validated by the automated assistant.

Once a behavior is completely validated, at least to the satisfaction of the user, it may be executed by the standard execution module 150. The standard execution module 150 executes the validated behavior autonomously to completion.

With the above as foundation, certain aspects of the present invention will now be discussed in greater detail.

Behavior Acquisition

In accordance with the embodiment of the present invention, the operational requirements of a behavior are encapsulated in a reactive system. The reactive system is a state machine (finite or infinite) that changes its internal state in response to an external stimulus (e.g., input) and each state is associated with a fixed set of readouts (e.g., outputs).

In reactive systems, it is useful to express the functional requirements of a behavior in terms of scenarios. A "scenario", as used herein, is an interleaved sequence of stimuli and readout observations for a reactive system. As discussed previously, a "situation" is a reference to the combination of a present state of the behavior (e.g., steady state prior to any stimulus) and a particular input event. In response to each stimulus (e.g., input) encountered, the reactive system transitions to a new state and outputs its respective observation readouts. The readouts will directly control the action(s) of the automated assistant.

The reactive system representing the behavior can be implemented using various software languages as known in the art. Such languages, for example, include C and BL.2. In accordance with the embodiment of the present invention, the reactive system is implemented in the BL.2 language which is at present a research prototype programming language used in the Assistant-Like Variably-Operated Interface Design (ALVOID) system. The ALVOID system is described in Hall, *Agents Helping Agents: Issues in Sharing How-To Knowledge*; in Proc. 1995 AAAI Spring Symposium on Information Gathering from Heterogeneous, Distributed Environments, p 65–68, which is herein incorporated by reference for all purposes.

The BL.2 programming language is a concurrent, object-oriented language for expressing behaviors that includes several constructs for facilitating the understanding, reliability, and shareability of assistant behaviors. The following is a brief summary of select BL.2 programming constructs which will be used throughout the balance of the present specification. The (GOAL<comment>.<body>) statements in BL.2 are both structured comments and control constructs. Control can only leave the body via a (WIN) or (LOSE) statement. As such, the assistant is able to determine whether a subgoal of the task has succeeded or failed, thus facilitating automatic monitoring, recovery, and reporting by the automated assistant. The (INITIATE<variable><behavior invocation>) statement spawns a child behavior in a new thread and binds <variable>to a handle for the new thread so that the parent behavior may send events to the newly spawned behavior. The (MONITOR <thread>(IF-TERMINATES <term-body>) <body>) statement executes <body>, but if <thread>terminates before <body>does, control is immediately transferred to <term-body>. The MONITOR statement, for example, may be used to monitor a child behavior which is used by the behavior (i.e., parent) and to notify the user if a failure occurs as a result of premature termination of the child behavior.

To further facilitate discussion of the present invention, a behavior, for example, involving the purchase of concert tickets will be used (hereinafter referred to as "BUYTIX"). It will be appreciated that behaviors are typically idiosyncratic to the user 20 and that the ticket purchase behavior used herein is an example and is not meant to be restrictive in any manner. Illustratively, BUYTIX is presented in the BL.2 language as follows:

```
(DEFBEHAVIOR BUYTIX (?NUMTIX) . . .
   (GOAL "Buy tickets"
      (GOAL "Place call to ticket agency"
         (INITIATE ?CALL (VOICE-CALL "1 800 555 5555"))
         (AWAIT ((?CALL@READY) (WIN))))
      (MONITOR ?CALL
         (IF-TERMINATES
            (GOAL "Record failure and lose". . . (LOSE) ))
      (GOAL-OR "Select seat class"
         (GOAL-AND "Choose Grand tier?"
            (GOAL "Grand tier available?"
               (SAY ?CALL
                  "Do you have" ?NUMTIX "grand tier . . .")
               (IF (=(COLLECT-RESPONSE ?CALL) 1)
                  (WIN)
                  (LOSE)))
            (GOAL "Grand tier price <= $100?"
               (SAY ?CALL
                  "How much is a grand tier ticket?")
               (SET! ?PRICE (COLLECT-RESPONSE ?CALL))
               (IF (>?PRICE 100) (LOSE))
               (SET! ?CLASS "grand tier")
               (WIN)))
         (GOAL-AND "Choose Orchestra?"
            (GOAL "Orchestra available?")
               (SAY?CALL
                  "Do you have"?NUMTIX "orchestra . . .")
               (IF (=(COLLECT-RESPONSE ?CALL) 1)
                  (WIN)
                  (LOSE)))
            (GOAL "Orchestra price <= $100?"
               (SAY ?CALL
                  "How much is an orchestra ticket?")
               (SET! ? PRICE (COLLECT-RESPONSE ?CALL))
               (IF (>?PRICE 100) (LOSE))
               (SET!?CLASS "orchestra")
               (WIN)))
      (GOAL "Announce failure and hangup" . . . (WIN)))
      (GOAL "Place order"
         (SAY ?CALL
            "I want" ?NUMTIX ?CLASS "tickets")
         (SET!?CHARGE (COLLECT-RESPONSE ?CALL))
         (WIN))
      (GOAL "Get confirmation number" . . . (WIN))
      (GOAL "Authorize payment" . . . (WIN))
      (WIN))))
```

(Note: The above programming code example has been edited for clarity and brevity.)

As presented, BUYTIX operates by placing a call to the ticket agency and inquiring whether the appropriate number of grand tier tickets are available. If available, BUYTIX then determines whether the total ticket cost is less than $100.00. If so, the assistant places an order. If not, the assistant inquires whether orchestra tickets are available and cost less than $50.00, again placing the order if so. The above described BUYTIX behavior will be used throughout the specification to facilitate discussion of the present invention.

Guarded Execution

Figure 2:
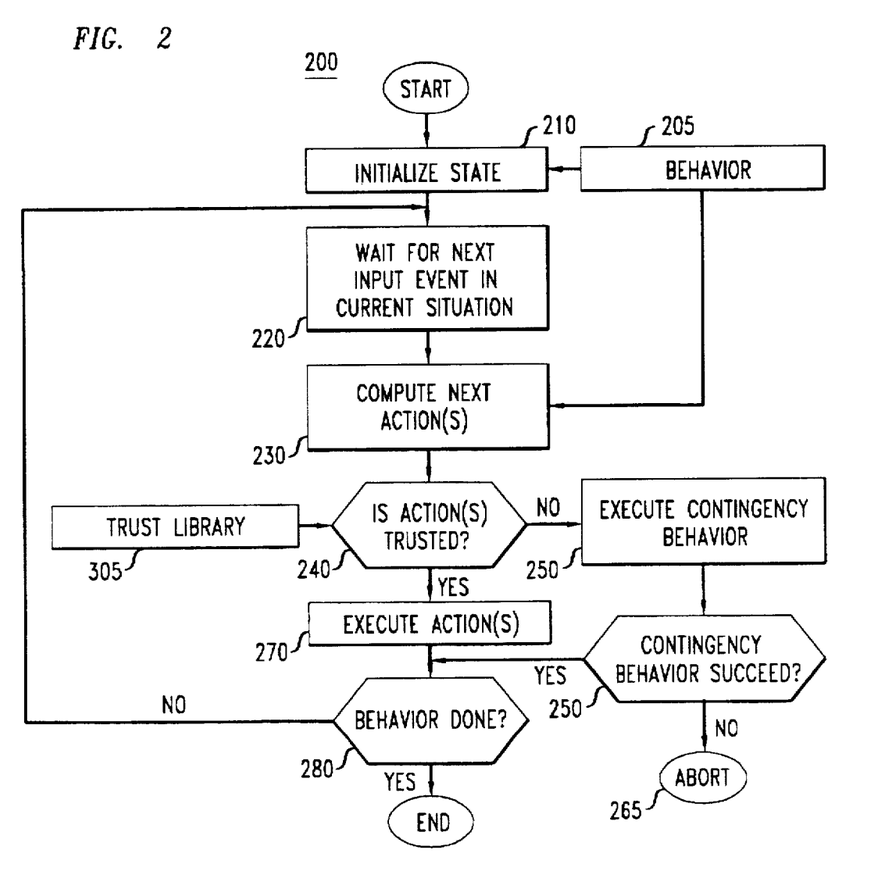
FIG. 2 is a flow diagram of an illustrative embodiment of the guarded execution module of FIG. 1.

As introduced previously, the guarded execution module executes the behavior and allows it to autonomously transition to a new state and perform actions only if the transition is known by the assistant to be trusted. To achieve this goal, readout events and state changes are queued and committed when the new state has been entirely computed. In accordance with the preferred embodiment, the behavior (implemented in BL.2) is automatically translated into a rule-based reactive system. This rule-based system is represented as an event based formalism (EBF). The EBF representation facilitates the queuing of state changes and events for later execution. In addition, a trust predicate is employed by the guarded execution module. In accordance with the embodiment of the present invention, the trust predicate has the form (Trusted? <event><oldstate><computed action>). The trust predicate returns true, if and only if the concrete situation (i.e., <oldstate>, <event>) and the computed action (i.e., <computed action>) form a situation/action pair that is trusted in the trust library. The implementation of the trust predicate will be discussed in greater detail later in the specification. If the transition is not trusted, the guarded execution module executes a predefined contingency behavior. The contingency behavior for example, may have the form (Contingency <event><state><computed action>). If the contingency behavior is successfully executed (i.e., WINs) then the original behavior is resumed; if it fails (i.e., LOSEs) then the original behavior LOSEs as well.

Referring now to FIG. 2, a flow chart depicting an illustrative embodiment of the guarded execution module 200 is shown. At step 210, input is received from behavior 205 which defines the initial state of the behavior. This input includes, for example, state information, a trust library, and the contingency behavior. As execution of the behavior takes place, the guarded execution module waits until the next concrete 15 situation is encountered, i.e., input event, at step 220. Upon encountering a concrete situation, the potential next action(s) of the behavior is computed in accordance with the behavior's knowledge at step 230. In accordance with the preferred embodiment, the next action(s) is computed using rule-based inference. The behavior itself consists of pattern action rules (e.g., "when <event>if current state satisfies <condition>then take <action(s)>"). These rules are employed to compute the next potential action (i.e., response) in an iterative fashion using the current state of the behavior and the current input event of the situation as inputs. At step 240, the situation/computed-action pair is compared with the entries in trust library 305 to determine whether it is trusted or not. If the next action(s) is trusted, it is carried out by the guarded execution module at step 270. If the next action(s) is not trusted, the contingency behavior is executed at step 250. Successful execution of the contingency behavior—which may involve taking more actions and changing states—causes the guarded execution module to proceed with execution of the behavior (i.e., return to step 280). Unsuccessful execution of the contingency behavior causes the assistant to abort the behavior (265) in a predetermined manner. Finally, a determination is made at step 280 as to whether the behavior has completed execution. If not, the behavior returns to step 220 to wait for the next situation encountered by the assistant.

In accordance with an embodiment of the invention, the contingency behavior described above is defined by the user when initiating the execution of the behavior. For example, if the user is available when the behavior is executed, the contingency behavior can be defined to query the user for permission to proceed. Such a query, for example, may include an explanation of the current state, input event and proposed output action(s). For purposes of discussion, this query is termed an "okay query" (hereinafter "OQ"). An example of an OQ for the BUYTIX behavior is as follows:

| OQ for BUYTIX behavior |
| --- |
| Previous state:<br>    GOAL =("Grand tier available?"<br>              "Choose Grand tier?"<br>              "Select seat class"<br>              "Buy tickets")<br>    NUMTIX =1<br>    SAYING ="Do you have 1 grand tier tickets<br>              available? Press 1 for yes, 0 for no"<br>    Event: (RESPONSE! 1)<br>Next state:<br>    GOAL =("Grand tier price <= $100?"<br>              "Choose Grand tier?"<br>              "Select seat class"<br>              "Buy tickets")<br>    NUMTIX =1<br>    SAYING ="How much is a grand tier ticket? Enter dollars"<br>*Is this action okay?* |

The above OQ example arises when the callee responds with a "1" when asked if grand tier tickets are available. If the user okays the transition, then such a contingency behavior would succeed. If the user does not okay the transition, then the user can either take over the interaction manually (e.g., pick up the phone and complete the ticket transaction himself), or take predefined steps to abort, such as playing an announcement and hanging up the phone. In any event, the user approves the new values of all state variables (not just the directly observable ones, such as SAYING above) and readouts.

Alternatively, the contingency behavior can provide for the safe, albeit conservative, unattended operation by ensuring that any untrusted transition results in safely aborting the operation. For example, if BUYTIX encounters an untrusted situation, it could simply say "Cancel transaction" and hang up. Such action is referred to as a safe abort.

It will be appreciated by those of ordinary skill in the art that it is possible to manually tailor a contingency behavior for each untrusted behavior. Typically, the two classes of contingency behaviors described in this section should be sufficient for many applications. In fact, since contingency behaviors must be trusted also, it is likely that a few, standard contingency behaviors for automated assistants will become prevalent.

Trust Library

Trust library 305 contains entries consisting of descriptions of sets of trusted situation/action pairs used by the guarded execution module to determine if a concrete situation is trusted. In accordance with the present embodiment of the invention, each entry is stored in the trust library as a tuple of the form (s, e, v, x) where "s" is the state description of a situation, "e" is the event schema of the situation, "v" is state variable associated with the state, and "x" is the expression of the new value of "v". The interpretation of the entry is such that when a situation occurs and its state satisfies "s" and its event satisfies "e", then the state variable "v" should take on the value of expression "x" (evaluated in the situation) in the next state. In accordance with the embodiment of the present invention, "actions" are encoded as changes to selected state variables as will be appreciated by those of ordinary skill in the art. The trust predicate is implemented as—Trusted? (<event><oldstate><newstate>)so that it returns true if and only if for every state variable "v" defined in <newstate>, we can find an entry "t" in the library such that:

1) <event>satisfies "e", the event pattern of "t";
2) <oldstate>satisfies "s", the state-condition of "t"; and
3) in <newstate>, "v" gets the value of expression "x".

In accordance with an embodiment of the present invention, the entries in the trust library are derived using sound scenario generalization. This sound scenario generalization technique represents each entry in the trust library as a generalized fragment. A generalized fragment is the generalization of a concrete fragment. An example of a generalized fragment for use with BUYTIX in the present embodiment is as follows:

| |
| --- |
| GEN-FRAG-16<br>    event: (RESPONSE!?number)<br>    cond: (AND (<= ?number 50)<br>             (=(STATE-VAR (GOAL))<br>             '("Orchestra price <= $50?"<br>               "Choose Orchestra?"<br>               "Select seat class"<br>               "Buy tickets")))<br>    variable: (SAYING)<br>    new-value:<br>        (FORMAT "I want" (STATE-VAR (NUMTIX))<br>        "orchestra tickets. Enter total price")<br>****Is this desirable? |

In the above generalized fragment, the user answers yes if, whenever a response "<=50" is received in a state where the goal is to determine if an orchestra ticket costs <=$50.00, it would be appropriate for the next verbal output (saying) to actually order the tickets. Sound scenario generalization is advantageous because the trust rules are more meaningful to the user who must approve them. Furthermore, since sound scenario generalization encodes many states and transitions symbolically, it usually results in a reduction in the size of the behavior description that is stored in memory.

Trust Growth

The trust growth module increases trust coverage of a behavior by adding new entries to the trust library. Thus, previously uncovered situations become trusted. To ensure that the entries are trusted, they are verified by the user prior to their placement in the trust library.

Figure 3:
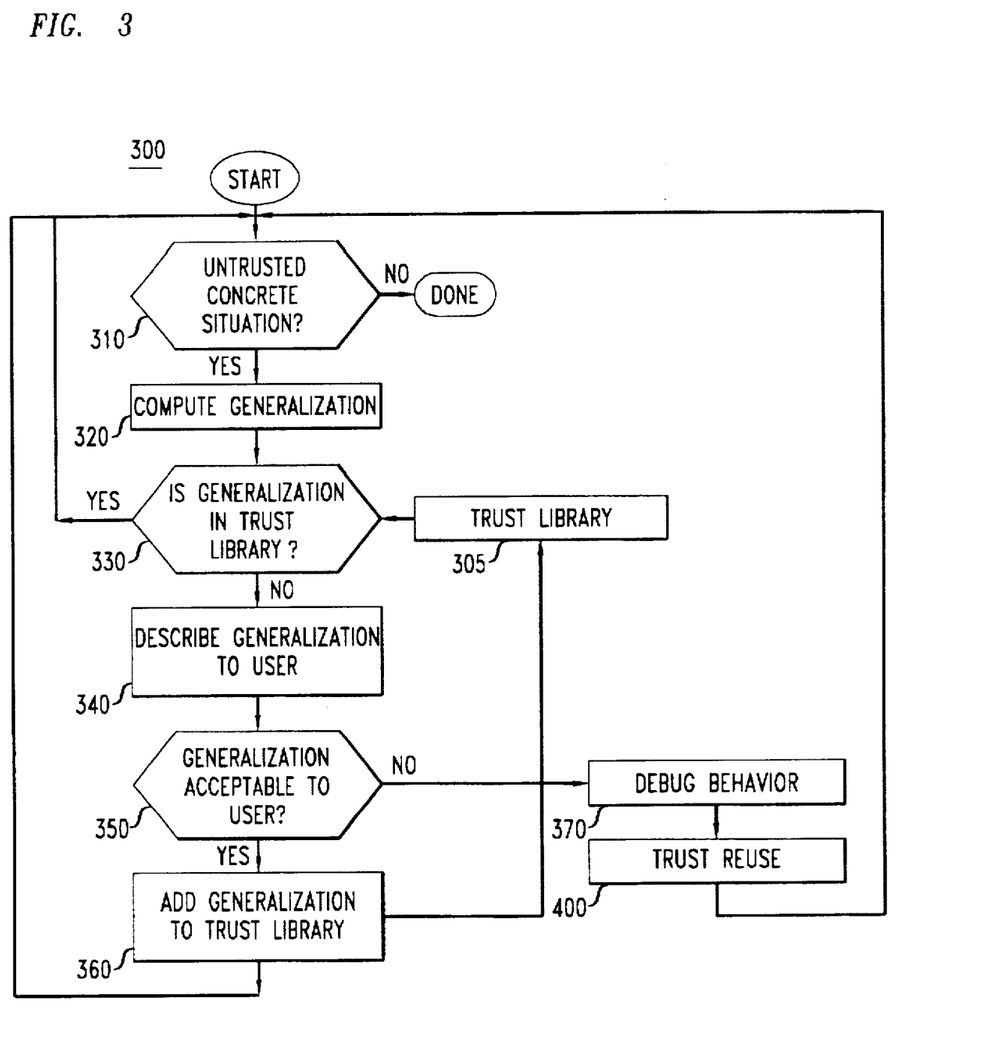
FIG. 3 is a flow diagram of an illustrative embodiment of the trust growth module of FIG. 1.

Referring to FIG. 3, a flow diagram depicting an illustrative embodiment of trust growth module 300 is shown. As previously discussed, when an untrusted concrete situation/action pair (i.e., the situation and associated computed action) is encountered by the guarded execution module 200 a record is made of the situation/action pair. For example, this record includes the state, event, and untrusted new variable (and its value) which are stored as a concrete scenario fragment. Subsequently, the user, for example, invokes trust growth module 300 for an interactive session to sequence through the untrusted concrete fragments at step 310. According to the embodiment, the interactive session computes a sound scenario generalization 320 of the concrete untrusted fragment using the sound scenario generalization technique (for example, as previously discussed and described in Hall).

Figure 4:
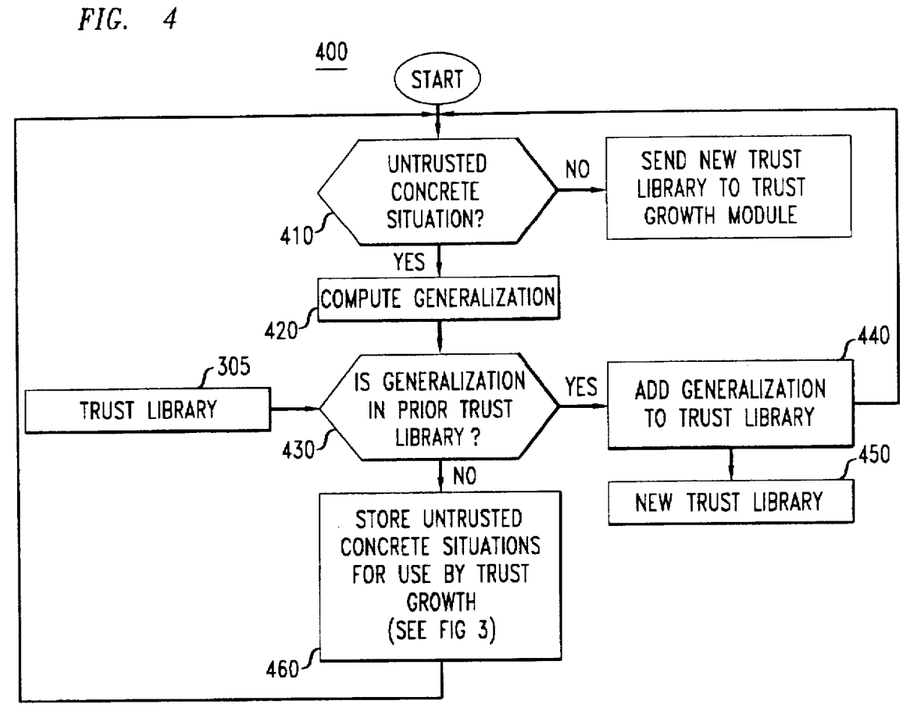
FIG. 4 is a flow diagram of an illustrative embodiment of the trust reuse module of FIG. 1.

The computed generalized fragment is compared in step 330 with the existing generalizations contained in trust library 305. If an equivalent generalization already exists in trust library 305 the trust growth module 300 proceeds to the next recorded untrusted concrete situation (i.e., returns to step 310). If no comparable generalization exists, the computed generalized fragment is presented to the user for review at step 340. The user is then queried as to the acceptability of the computed generalized fragment in step 350. If acceptable, the computed generalized fragment is entered, as a new generalization, into trust library 305 at step 360. The module then proceeds to analyze the next untrusted concrete situation/action pair. Alternatively, if the user responds that the computed generalized fragment is not acceptable, this is an indication that there is an error in the behavior. Such an error causes the behavior to be debugged at step 370. The output of debugging step 370 is a new behavior representation which is then used as input to the trust reuse module 400 which is described in greater detail below.

In accordance with the above described embodiment, the trust library 305 contained existing generalizations at the start of the trust growth process for use in validating the computed generalization. However, in some instances, there may not be an opportunity for adequate trust growth before the execution of a particular behavior to have such a populated trust library. For example, certain behaviors may be executed only for a single instance or must work trustably (i.e., succeed) upon initial execution. Thus, in an alternative embodiment of the present invention, a user is provided the opportunity for an initial trust library growth phase carried out in a simulated behavior environment. In accordance with this embodiment, the particular behavior in question is carried out in a simulated environment wherein all computed actions affect simulated entities rather than actual entities. Guarded execution and trust growth occur as described previously with the exception that all computed actions are applied within the simulated behavior environment rather than to real-world affectors. After the user has satisfactorily developed the trust library within the simulated behavior environment, the behavior is then executed via the guarded execution module in a real-world environment using this trust library to begin trust growth. Advantageously, initializing the trust growth process with the trust library developed using a simulated behavior environment will increase the likelihood that the behavior will succeed in those real-world cases where initial trust growth is constrained.

Trust Reuse

As discussed above in regard to the trust growth module 300, the user is queried regarding whether a particular computed generalized fragment is acceptable (see FIG. 3, step 350). If the user responds that the computed generalized fragment does not represent a desirable behavior, this indicates an error in the behavior, which causes the behavior to be debugged (see FIG. 3, step 370). To facilitate the rapid building of trust in a debugged behavior, a trust-transfer procedure is employed which takes the entries in the trust library (i.e., the trust library prior to debugging) to construct a new trust library.

Referring now to FIG. 4, the trust reuse module 400 is used when an erroneous behavior is encountered. This module takes each of the untrusted concrete fragments 410, generalizes 420 them with respect to the new (debugged) behavior and determines if the computed generalization is equivalent 430 to an entry in the existing trust library 305 (i.e., the trust library as it existed prior to the debugging of the behavior). If an equivalent generalization is found, the new generalized fragment is automatically entered 440 into the new trust library 450 without requiring the user's validation since the user has previously indicated approval. If no equivalent is identified, the untrusted concrete fragment is passed in step 460 to trust growth module 300 for validation and eventual inclusion in the new trust library. This validation will be accomplished as previously described but will use the debugged behavior and new trust library for all validation purposes. Trust reuse, therefore, advantageously uses trusted fragments in trust library 305 to develop new trust library 450, thereby eliminating the need to validate a behavior completely anew.

A further illustration of an automated assistant employing various aspects of the present invention will now be discussed using the BUYTIX behavior. In the following example, the user delegates the ticket-buying task to the automated assistant.

BUYTIX is executed by the guarded execution module with an initially empty trust library. Since the trust library is empty, the user employs a standard interactive contingency behavior. The following is an example excerpt from a transcript of the illustrative interaction. Audible output played (via known text-to-speech techniques) by the assistant into the phone-line is indicated in italic font; touch-tone responses received from the callee appear in bold font. <OQ? Yes>indicates an accepted OQ.

| | |
|---|---|
| *Do you have 1 grand tier tickets available? 1 for yes.* | |
| 1 | <OQ? Yes> |
| *How much is a grand tier ticket? Enter dollars* | |
| 120 | <OQ? Yes> |
| *Do you have 1 orchestra tickets available? 1 for yes* | |
| 1 | <OQ? Yes> |
| *How much is an orchestra ticket? Enter dollars* | |
| 40 | <OQ? Yes> |
| *I want 1 orchestra ticket. Enter total price* | |
| 43 | <OQ? Yes> |
| *Enter confirmation number* | |
| 9999 | <OQ? Yes> |
| *Send to AL VOID, 600 Mountain Ave, Murray Hill, NJ.* | |
| *Payment of $43 is authorized on acct#1111. (hangup)* | |

The preceding interaction indicates that 6 out of 6 transitions require an OQ. The user will now enter the first trust growth phase. In this example, the automated assistant presents in turn 26 generalized fragments computed from concrete fragments of the proceding interaction. Suppose that the first 18 generalized fragments are accepted by the user. The 19th generalized fragment, which is rejected by the user, is as follows:

```
GEN-FRAG-19—
    event: (RESPONSE! ?number)
    cond: (=(STATE-VAR (GOAL))
           '("Place order" "Buy tickets"))
    variable: (GOAL)
    new-value: '("Get confirmation number" "Buy tickets")
is this desirable? NO
```

As presented, the behavior appears to lack a check for an exorbitant "service charge" which may be added to the ticket price. The user of the automated assistant, of course, would not want to pay an unlimited price for the tickets. Thus, the behavior itself has a general error. Two other generalized fragments show symptoms of this error (i.e., the lack of a price cap) as well, so they are also disconfirmed. Up to this point, the system behaved correctly when executed by the guarded execution module, but the trust growth module has uncovered a general error. Illustratively, 20 generalized fragments were confirmed, 3 were disconfirmed, and 3 are redundant (i.e., covered by another generalized fragment).

To correct the erroneous behavior, the user adds for example, the following:

```
(IF (>?CHARGE (*1.1 (* ?NUMTIX ?PRICE)))
     (GOAL "Fail: srvc charge too high."...))
```

This correction creates a new behavior which is now in conformance with the user's goals and priorities (i.e., task parameters). However, the trust library previously used with the old behavior may no longer be valid for the new behavior. Therefore, the user applies the trust-transfer procedure, using the fragments in the old trust library to help populate the new (empty) trust library. This entails generalizing each old, concrete fragment with respect to the debugged behavior, and the result is checked for equivalence to the generalized fragments in the old trust library (i.e., prior to debugging). Because of the simplicity of the above described repair, all 20 of the generalized fragments transfer automatically to the new library. Moreover, the 3 concrete fragments that resulted in undesired generalizations (i.e., GEN-FRAG-19 through-21) are generalized and the user now confirms their generalizations (in the debugged behavior) as desirable. The following shows that trust has grown, because only one of the four transitions requires an OQ, whereas all 4 would require them with an empty trust library.

```
Do you have 2 grand tier tickets available?. 1 for yes
  1
How much is a grand tier ticket? Enter dollars
  95                                            <OQ? Yes>
I want 2 grand tier tickets. Enter total price
  200
Enter confirmation number
  8888
Send to ALVOID, 600 Mountain Ave, Murray Hill, NJ.
Payment of $200 is authorized on acct#1 111. (hangup)
```

Illustratively, the user continues building trust for several rounds of guarded mode execution followed by trust growth. The frequency of OQs diminishes so that, at some point, the user would like to determine whether the behavior is fully trusted and if not, which cases remain to be checked. In accordance with the present invention, an additional advantage associated with representing trust formally is that a non-coverage report, which is a declarative description of the situations currently not covered by the library, can be computed at anytime. By having the non-coverage report, a user can identify the cases that are not yet trusted and construct scenarios to exercise those situations. Thus, a user may determine when trust coverage is complete and that the behavior need not be executed in guarded mode. An example of such a non-coverage report for the present illustrative embodiment is as follows:

```
Noncoverage Report
(RESPONSE!(?number) @CLASS):
(RESPONSE!(?number) @CLASS-PRICE):
(RESPONSE!(?number) @TOTAL-PRICE):
(RESPONSE!(?number) @NUMTIX):
(RESPONSE!(?number) @GOAL):
(RESPONSE!(?number) @SAYING):
  (OR (AND (=(STATE-VAR (GOAL))
              '("Orchestra price <=$50?"
                "Choose Orchestra?"
                "Select seat class"
                "Buy tickets"))
           (>?number 50))
      (AND (=(STATE-VAR (GOAL))
              '("Orchestra available?"
                "Choose Orchestra?"
                "Select seat class"
                "Buy tickets"))
           (NOT(= 1 ?number))))
6 out of 18 signatures completely covered
6 out of 18 signatures completely uncovered:
   (DISCONNECT! CLASS-PRICE), (DISCONNECT! GOAL)
   (DISCONNECT! 'NUMTIX), (DISCONNECT! CLASS)
   (DISCONNECT! SAYING), (DISCONNECT! TOTAL-PRICE)
```

As shown above, the noncoverage report describes the set of states not yet trusted for each combination of event and observation (i.e., each signature). In particular, it shows that the behavior is trusted to SAY an appropriate utterance after each RESPONSE! event, except when either (a) the callee indicates an orchestra price greater than $50, or (b) the callee indicates there are not enough orchestra seats available. The uncovered DISCONNECT! signatures indicate that no callee has yet hung up in the middle. The user can infer both that guarded execution mode is still necessary and exactly which input cases to construct to complete the trust coverage.

Figure 5:
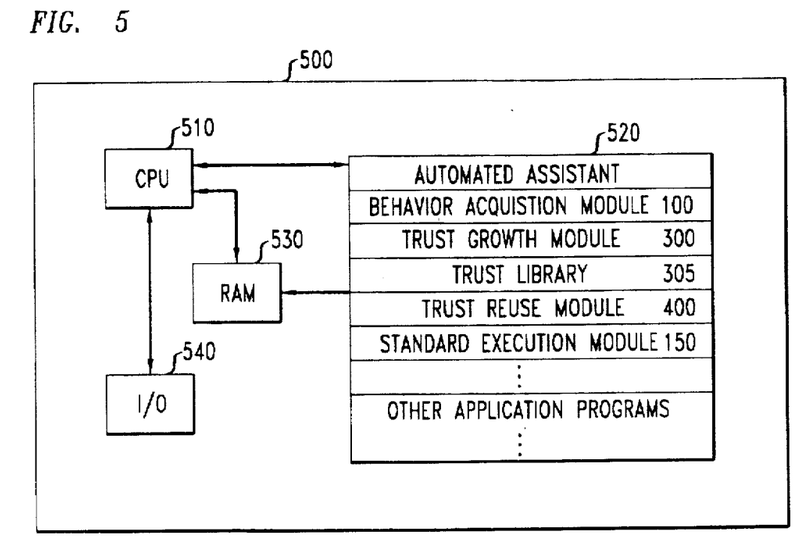
FIG. 5 is functional block diagram of an illustrative embodiment of a computer system employing the present invention.

The invention has been particularly described above in terms of a method for building trust in the execution of a behavior by an automated assistant. In practical applications, the invention will be implemented in a computer system. For example, in FIG. 5, a computer system 500 is shown having a central processing unit (CPU) 510, main memory 520, random access memory (RAM) 530 and input/output drivers 540. Main memory 520 contains, for example, the program code for implementing the automated assistant, behavior acquisition module 100, trust growth module 300, trust library 305, trust reuse module 400, standard execution module 150, and other various application programs. Illustratively, the automated assistant is executed by CPU 510 which causes the various modules (i.e., behavior acquisition, trust growth, etc.) to be loaded into RAM 530 for execution. The automated assistant may interface with various external peripherals or other computer systems. This interface is facilitated by CPU 510 through input/output drivers 540.

Finally, while the invention has been particularly shown and described with reference to various embodiments, it will be recognized by those skilled in the art that modifications and changes may be made to the present invention without departing from the spirit and scope thereof. Therefore, the invention in its broader aspects is not limited to specific details shown and described herein. Accordingly, various modifications may be made without departing from the spirit or scope of the general inventive concept as defined by the appended claims and their equivalents.

I claim:

1. A method for increasing trust of an automated assistant executing a task on a computer system, said method comprising the steps of:

executing a behavior in a mode which employs a trust library containing a set of trusted responses;

receiving an input event during said execution of said behavior;

computing a response for said behavior which satisfies said input event; and comparing said computed response with said set of trusted responses to determine whether a match occurs, and (a) if a match occurs, executing said computed response, otherwise (b) if no match occurs, validating said trust of said computed response for inclusion in said trust library, said validating being accomplished by computing a sound scenario generalization of said computed response.

2. The method of claim 1, wherein each trusted response of said set of trusted responses is represented as a trusted situation/action pair.

3. A method for use by an automated assistant executing on a computer system, said automated assistant performing a user task by employing a behavior which represents the knowledge used by said automated assistant to perform said task, said method comprising the steps of:

executing said behavior in a mode which employs a trust library containing a set of trusted situation/action pairs;

receiving an input event during said execution of said behavior, said input event and a present state of said behavior jointly defining a situation for processing by said behavior;

computing an action for execution by said behavior which satisfies said situation; and comparing a situation/computed-action pair represented by said situation and said computed action with said set of trusted situation/action pairs to determine whether a match occurs, and (a) if a match occurs, executing said computed action, otherwise (b) if no match occurs, executing a predetermined response and
  (i) computing a generalization of said situation/computed-action pair, said generalization computed using sound scenario generalization;
  (ii) determining the acceptability of said computed generalization; and
  (iii) adding said computed generalization to said trust library if found to be acceptable in said determining step.

4. The method of claim 3, wherein said behavior is represented as a reactive system.

5. The method of claim 4, wherein said reactive system is implemented using the BL.2 programming language.

6. The method of claim 3, wherein said determining step is a query to said user regarding the acceptability of said computed generalization.

7. The method of claim 3, wherein the initial said set of trusted situation/action pairs of said trust library is generated prior to said execution of said behavior using a simulated behavior environment.

8. The method of claim 3, wherein said behavior is defined using programming by demonstration.

9. The method of claim 3, wherein subsets of said set of trusted situation/action pairs are stored in said trust library as tuples, each said tuple having the form (s, e, v, x) where "s" is a state description of said trusted situation, "e" is an event schema of said trusted situation, "v" is a state variable associated with said state description, and "x" is a value for "v".

10. The method of claim 3 including the further step of:
debugging said behavior when the result of said determining step is that said computed generalization is unacceptable.

11. The method of claim 10 including the further steps of:
computing a second generalization of said situation/computed-action pair as a function of said debugged behavior; and
determining if said second generalization is contained in said trust library, and if so contained, adding said second generalization to a second trust library for use by said debugged behavior.

12. The method of claim 3, including the further step of:
generating during the course of said execution of said behavior a report which contains a description of any situations not covered by a situation/action pair in said trust library.

13. A method for use by an automated assistant executing on a computer system, said automated assistant performing a user task by employing a behavior which represents the knowledge used by said automated assistant to perform said task in conformance with user task parameters, said method comprising the steps of:

executing said behavior in a mode which employs a trust library containing a set of trusted situation/action pairs, said trusted situation/action pairs defining actions for said behavior which are known to be in conformance with said user task parameters;

receiving a plurality of input events during said execution of said behavior, each said input event and a present state of said behavior jointly defining a situation for processing by said behavior;
  (a) computing an action for execution by said behavior which satisfies said situation;
  (b) comparing a situation/computed-action pair represented by said situation and said computed action with said set of trusted situation/action pairs to determine whether a match occurs, and (1) if a match occurs, executing said computed action, otherwise (2) if no match occurs, executing a predetermined contingency behavior, and
    (i) computing a generalization of said situation/computed-action pair,
    (ii) determining the acceptability of said computed generalization, and
    (iii) adding said computed generalization to said trust library if found to be acceptable in said determining step;

performing steps (a) and (b) in an iterative fashion to respond to each said input event of said plurality of input events received during said execution of said behavior; and generating during the course of said execution of said behavior a report which contains a description of any situations not covered by a situation/action pair in said trust library.

14. A method for use by an automated assistant executing on a computer system, said automated assistant performing a user task by employing a behavior which represents the knowledge used by said automated assistant to perform said task, said method comprising the steps of:

executing said behavior in a mode which employs a trust library containing a set of trusted situation/action pairs;

receiving an input event during said execution of said behavior, said input event and a present state of said behavior jointly defining a situation for processing by said behavior;

computing an action for execution by said behavior which satisfies said situation; and comparing a situation/computed-action pair represented by said situation and said computed action with said set of trusted situation/action pairs to determine whether a match occurs, and (a) if a match occurs, executing said computed action, otherwise (b) if no match occurs, executing a predetermined contingency behavior, and
  (i) computing a generalization of said situation/computed-action pair;
  (ii) determining the acceptability of said computed generalization; and (iii) adding said computed generalization to said trust library if found to be acceptable in said determining step; and generating during the course of said execution of said behavior a report which contains a description of any situations not covered by a situation/action pair in said trust library.

15. The method of claim 14, wherein said predetermined contingency behavior aborts said execution of said behavior.

16. The method of claim 14, wherein said predetermined contingency behavior queries said user to determine the acceptability of said situation/computed-action pair.

17. A method for use by an automated assistant executing on a computer system, said automated assistant performing a user task by employing a behavior which represents the knowledge used by said automated assistant to perform said task in conformance with user task parameters, said method comprising the steps of:

executing said behavior in a mode which employs a trust library containing a set of trusted situation/action pairs, said trusted situation/action pairs defining actions for said behavior which are known to be in conformance with said user task parameters;

receiving a plurality of input events during said execution of said behavior, each said input event and a present state of said behavior jointly defining a situation for processing by said behavior;

(a) computing an action for execution by said behavior which satisfies said situation;

(b) comparing a situation/computed-action pair represented by said situation and said computed action with said set of trusted situation/action pairs to determine whether a match occurs, and (1) if a match occurs, executing said computed action, otherwise (2) if no match occurs, executing a predetermined response and (i) computing a sound scenario generalization of said situation/computed-action pair, (ii) determining the acceptability of said computed generalization, and (iii) adding said computed generalization to said trust library if found to be acceptable in said determining step; and performing steps (a) and (b) in an iterative fashion to respond to each said input event of said plurality of input events received during said execution of said behavior.

18. An apparatus employed by an automated assistant executing on a computer system, said automated assistant performing a user task by employing a behavior which represents the knowledge used by said automated assistant to perform said, said apparatus comprising:

means for executing said behavior in a mode which employs a trust library containing a set of trusted situation/action pairs;

means for receiving an input event during said execution of said behavior, said input event and a present state of said behavior jointly defining a situation for processing by said behavior;

means for computing an action for execution by said behavior which satisfies said situation;

means for comparing a situation/computed-action pair represented by said situation and said computed action with said set of trusted situation/action pairs to determine whether a match occurs, and (a) if a match occurs, executing said computed action, otherwise, (b) if no match occurs, then (i) computing a generalization of said situation/computed-action pair, (ii) determining the acceptability of said computed generalization, and (iii) adding said computed generalization to said trust library if found to be acceptable;

means for debugging said behavior when said computed generalization is unacceptable;

means for computing a second generalization of said situation/computed-action pair as a function of said debugged behavior; and means for determining if said second generalization is contained in said trust library, and if so contained, adding said second generalization to a second trust library for use with said debugged behavior.

19. A method for increasing trust of an automated assistant executing a task on a computer system, said method comprising the steps of:

executing a behavior in a mode which employs a trust library containing a set of trusted responses;

receiving an input event during said execution of said behavior;

computing a response to be carried out by said behavior which satisfies said input event; and comparing said computed response with said set of trusted responses to determine whether a match occurs, and (a) if a match occurs, executing said computed response, otherwise (b) if no match occurs, validating said trust of a set of untrusted responses, said validating step utilizing a sound scenario generalization to validate said trust of said set of untrusted responses, and said set of untrusted responses including said computed response.

20. The method of claim 19, wherein said set of trusted responses are trusted situation/action pairs.

21. The method of claim 19, comprising the further steps of:

debugging said behavior;

computing a second response as a function of said debugged behavior; and determining if said second response is contained in said trust library, and if so contained, adding said second response to a second trust library for use by said debugged behavior.

22. The method of claim 19, wherein the initial said set of trusted responses is generated prior to said execution of said behavior using a simulated behavior environment.

23. The method of claim 19, wherein said automated assistant selects said behavior from a central source.

24. The method of claim 19, wherein said method includes the further step of:

executing a predetermined response when said computed response is found not to be in said set of trusted responses.

25. The method of claim 24, wherein said predetermined response aborts said execution of said behavior.

26. The method of claim 24, wherein said predetermined response performs a query to determine the acceptability of said computed response.

* * * * *